(No Model.) 7 Sheets—Sheet 1.
H. F. CLARK.
APPARATUS FOR AUTOMATIC FOG SIGNALING ON RAILWAYS.
No. 523,424. Patented July 24, 1894.

WITNESSES
George H. Bliss.
Louis M. Evans.

INVENTOR
H. F. Clark
by Herbert W. T. Jenner, Attorney (No Model.) 7 Sheets—Sheet 2.
H. F. CLARK.
APPARATUS FOR AUTOMATIC FOG SIGNALING ON RAILWAYS.
No. 523,424. Patented July 24, 1894.
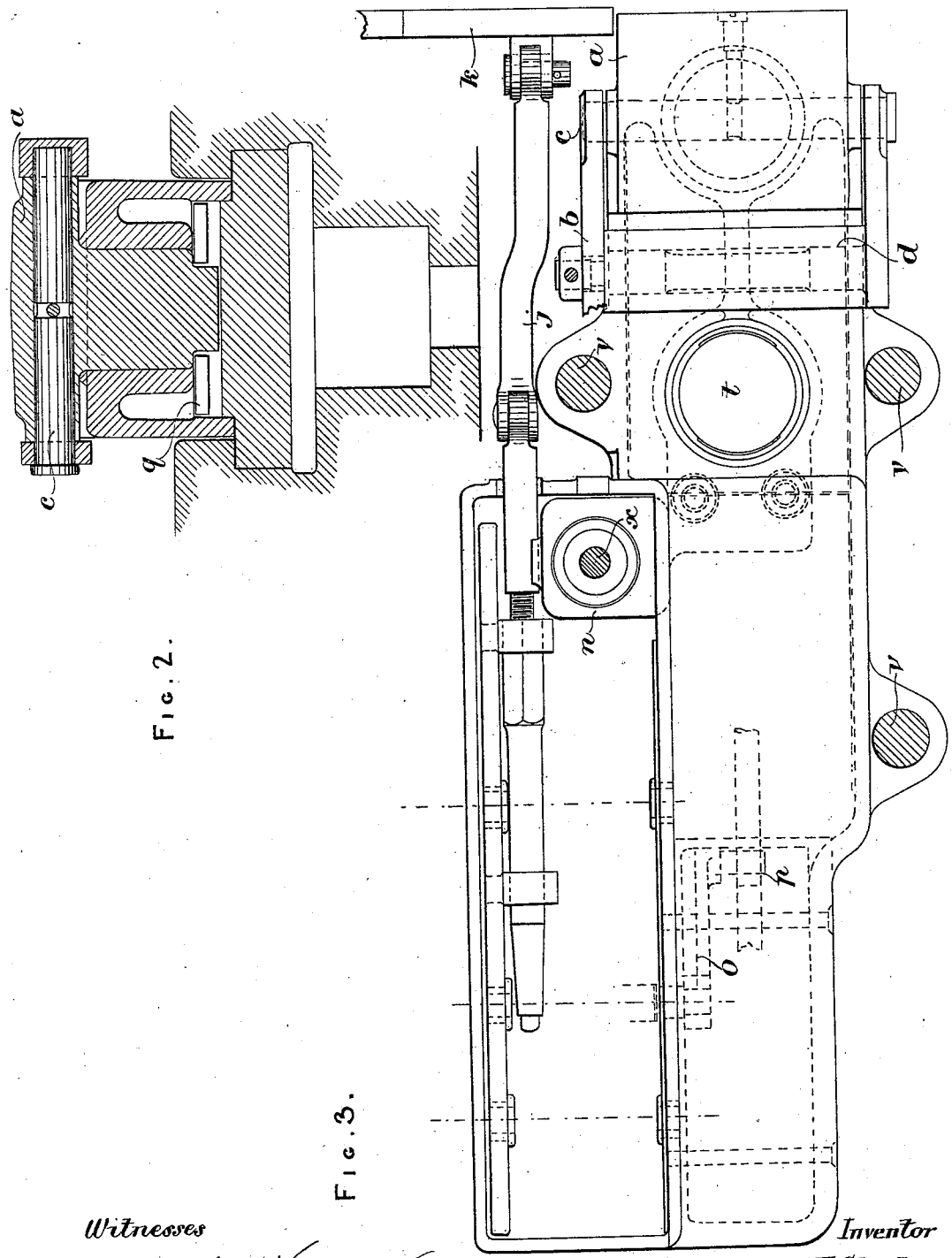

(No Model.)  7 Sheets—Sheet 3.
H. F. CLARK.
APPARATUS FOR AUTOMATIC FOG SIGNALING ON RAILWAYS.
No. 523,424.  Patented July 24, 1894.
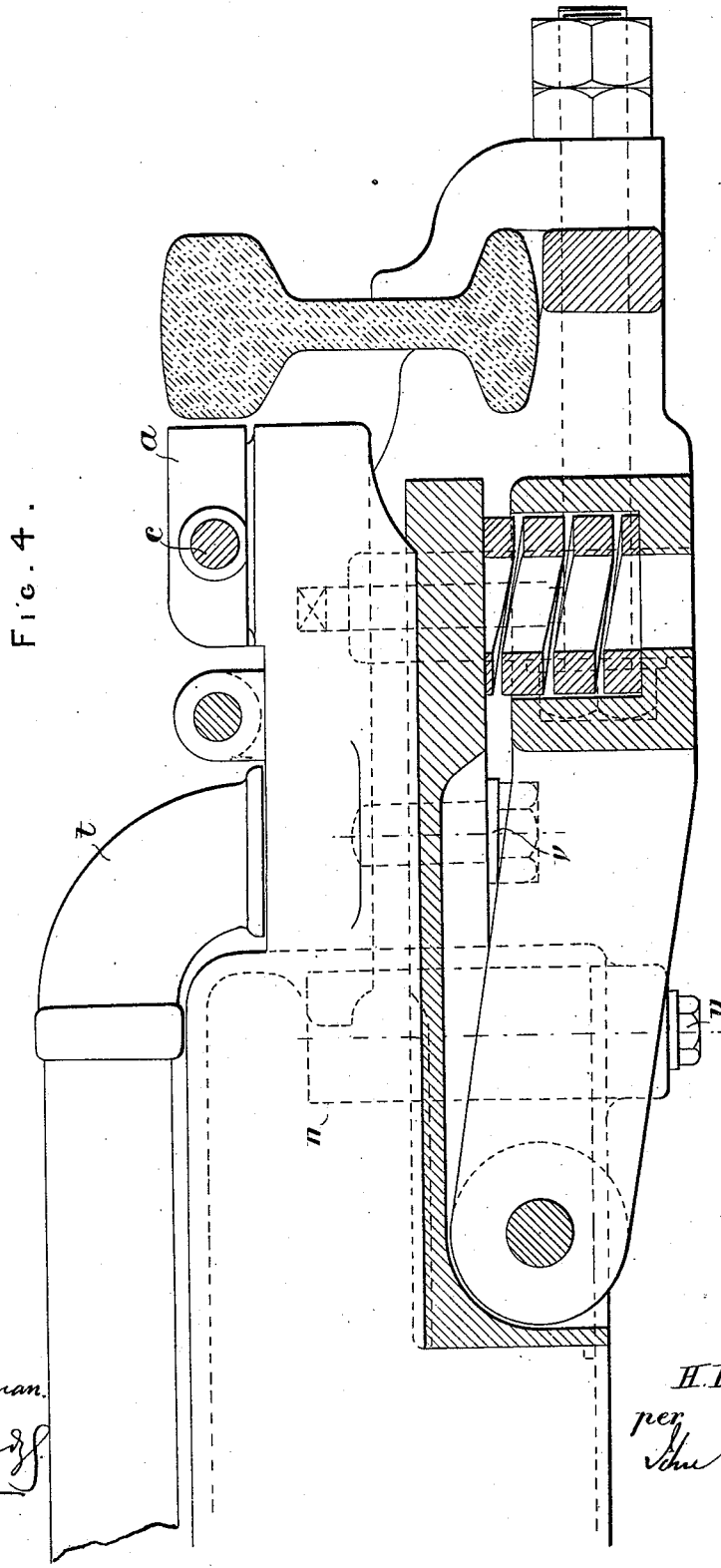

(No Model.)
7 Sheets—Sheet 4.
H. F. CLARK.
APPARATUS FOR AUTOMATIC FOG SIGNALING ON RAILWAYS.
No. 523,424.
Patented July 24, 1894.
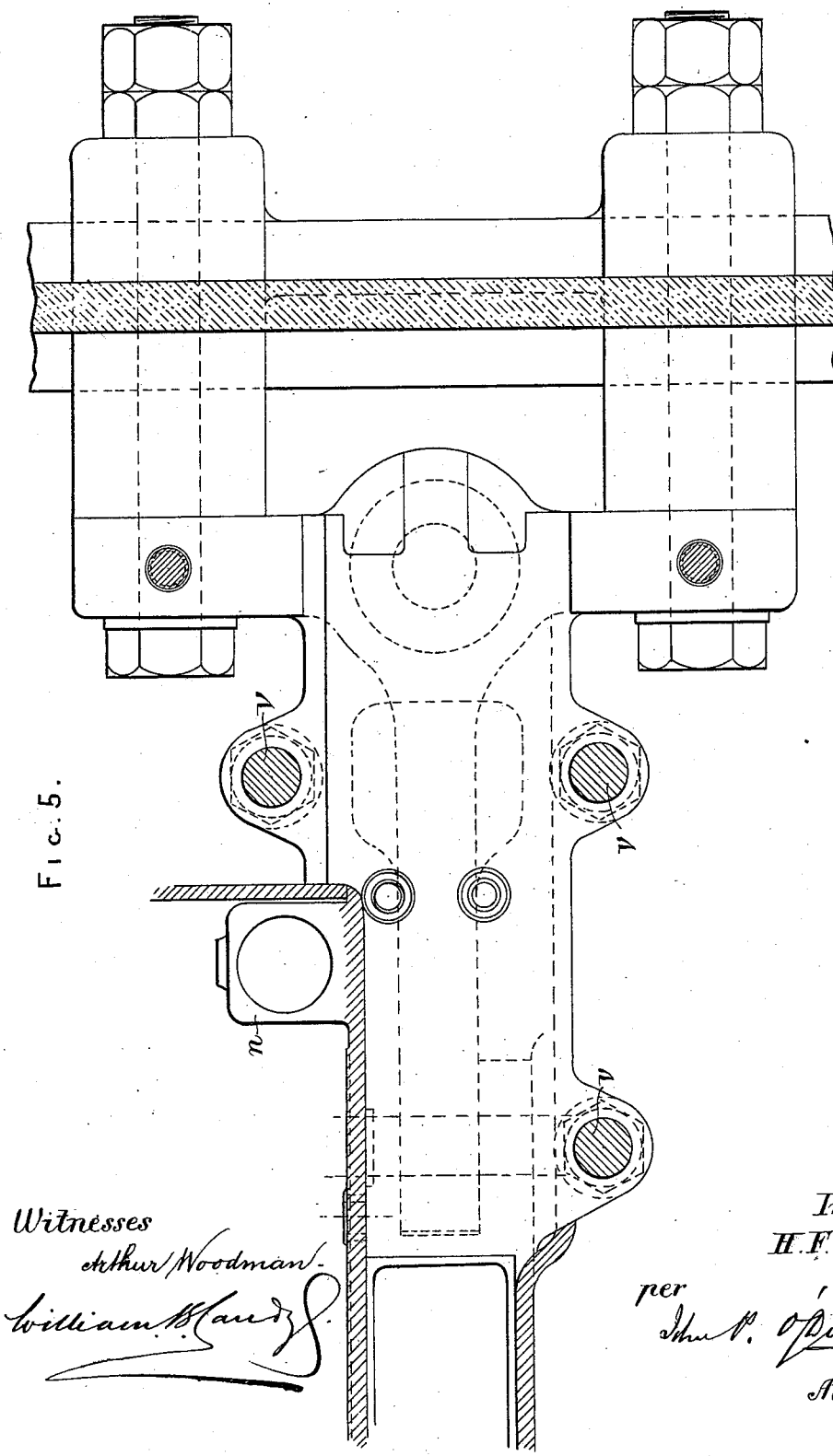

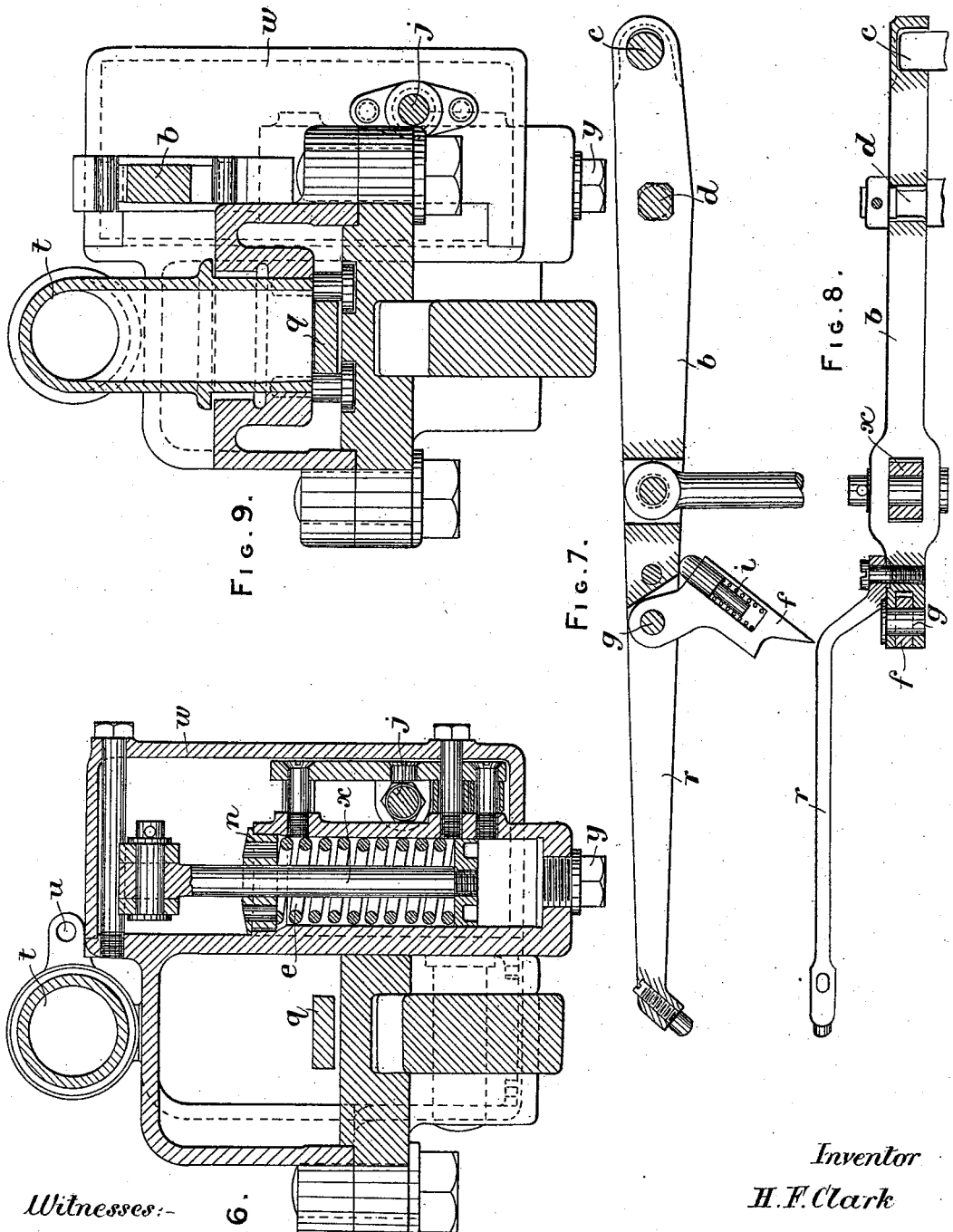

(No Model.) 7 Sheets—Sheet 6.
H. F. CLARK.
APPARATUS FOR AUTOMATIC FOG SIGNALING ON RAILWAYS.
No. 523,424. Patented July 24, 1894.
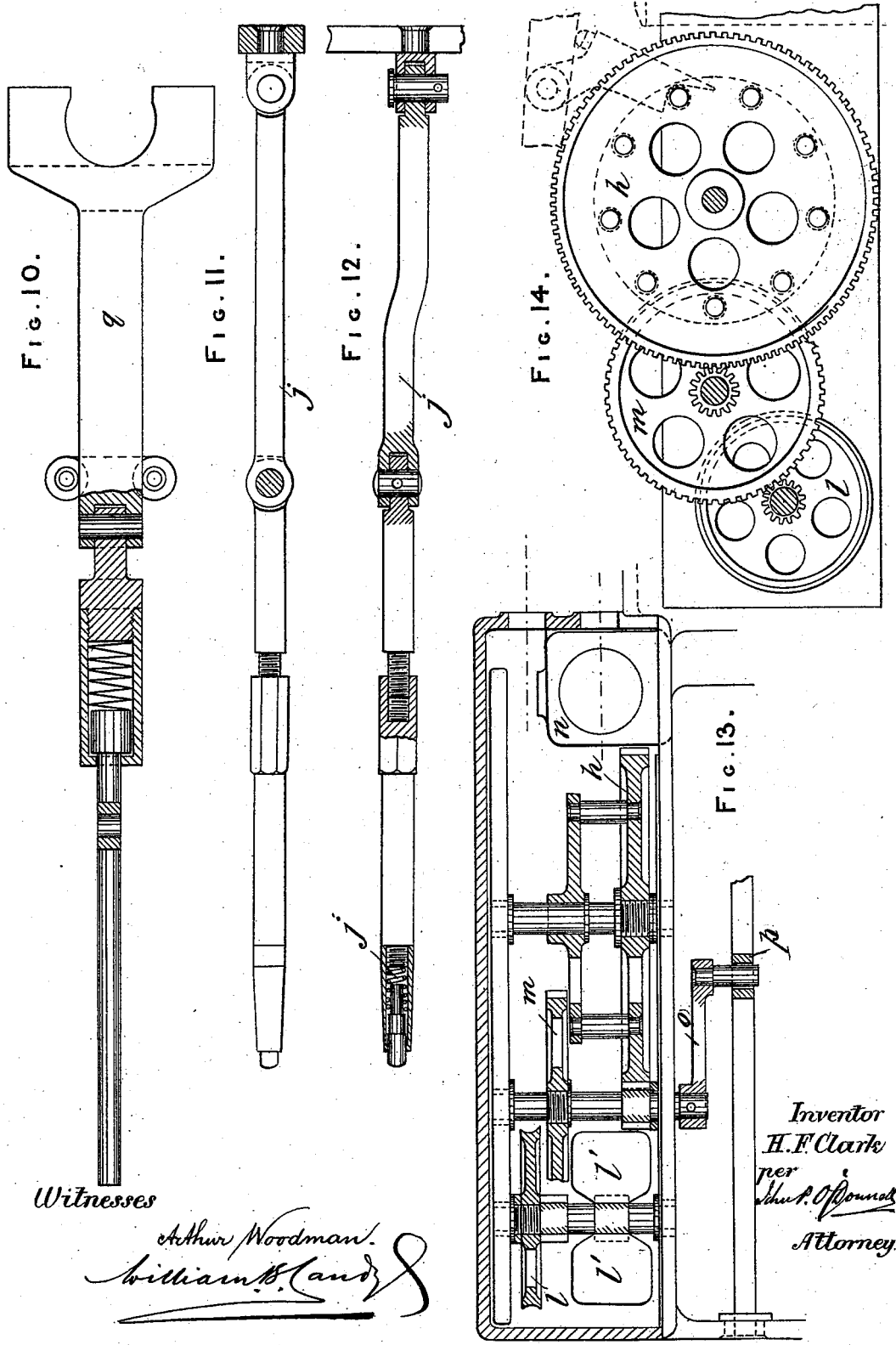
Witnesses
Arthur Woodman
William B. Candy
Inventor
H. F. Clark
per
John P. O'Donnell
Attorney (No Model.)  7 Sheets—Sheet 7.

H. F. CLARK.
APPARATUS FOR AUTOMATIC FOG SIGNALING ON RAILWAYS.

No. 523,424.  Patented July 24, 1894.

Witnesses:
Arthur Woodman.
William H. Lantz

Inventor
H. F. Clark
per John P. O'Donnell
Attorney

UNITED STATES PATENT OFFICE.

HENRY FROST CLARK, OF EASTON, PENNSYLVANIA.

APPARATUS FOR AUTOMATIC FOG SIGNALING ON RAILWAYS.

SPECIFICATION forming part of Letters Patent No. 523,424, dated July 24, 1894.

Application filed January 17, 1894. Serial No. 497,187. (No model.)

*To all whom it may concern:*

Be it known that I, HENRY FROST CLARK, a citizen of the United States, residing at Easton, in the State of Pennsylvania, have invented a new and Improved Apparatus for Automatic Fog Signaling on Railways, of which the following is a specification.

My invention has reference to an improved apparatus for automatic fog signaling on railways. In previous efforts in this direction, apparatus has been devised for operating with the signal connection for the distant or home signal, or any signal, so that the detonator is in position on the rail when the signal is in the "danger" attitude and is removed therefrom when the signal is deflected to the "safety" attitude.

With my apparatus I arrange that it is automatic in action and that a detonator is exploded irrespective of the position of the signal arm, that is to say, that the first wheel of the engine explodes the detonator and the apparatus works that no second explosion takes place unless desirable, for instance, it is occasionally desirable to have two explosions, but, immediately the last vehicle passes over the apparatus it automatically places another torpedo in position to be exploded.

In order that my invention may be better understood I will proceed to describe the drawings hereunto annexed.

Figure 1:
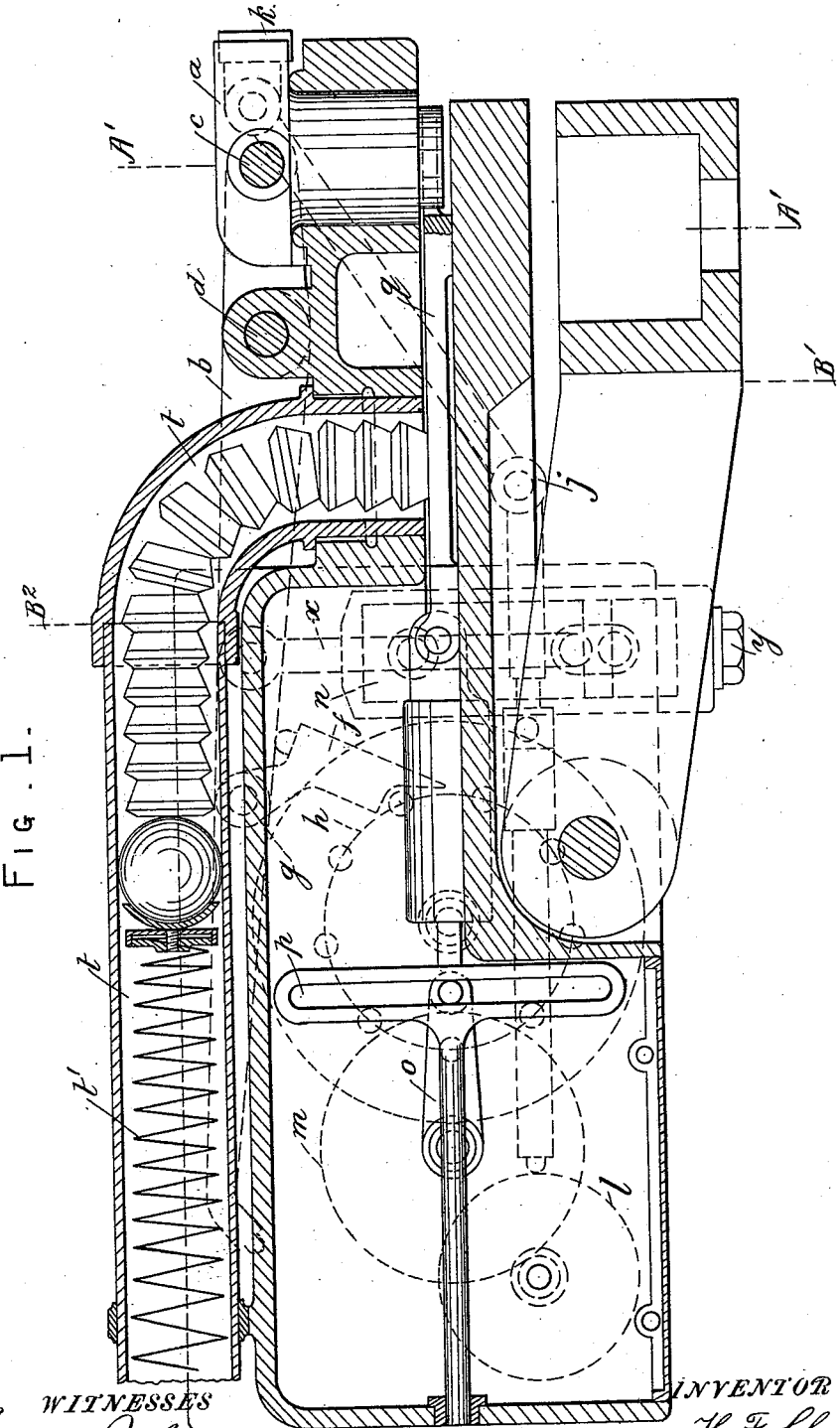
Figure 15:
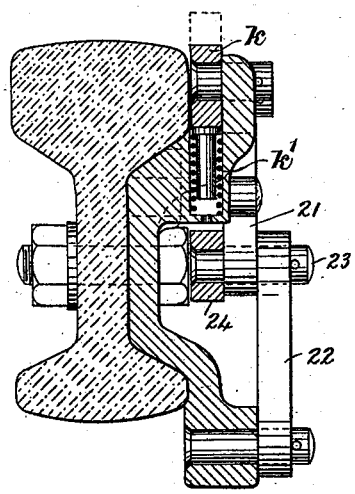
Figure 16:
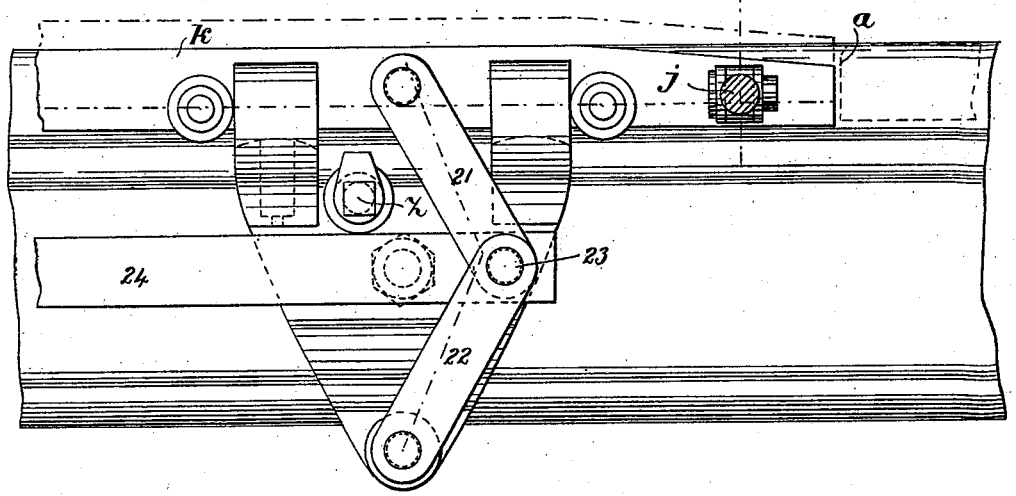

Figure 1 illustrates a cross section of my apparatus with only a portion of the detonator tube shown; the portion not shown is simply a continuation of the tube and spring. Fig. 2 illustrates a section A'—A' Fig. 1. Fig. 3 is a part plan of Fig. 1 with the magazine tube removed and the cover on the left hand side also removed. Fig. 4 is a view showing the method of connection to the rail and also illustrating the spring underneath the anvil for allowing for worn tires. Fig. 5 is a plan of Fig. 4 with the top of the rail removed, showing the method of clipping the web. The magazine $t$ is not shown in this figure. Fig. 6 illustrates an enlarged view of the connection $x$ to the lever $b$ viewed from the front of the rail. This illustrates the spiral spring $e$ referred to hereinafter. Fig. 7 is an enlarged view of the lever $b$ and the top brake $r$ on the wheel $l$. Fig. 8 is a plan view partly in section of Fig. 7. Fig. 9 is a sectional elevation $B'$—$B^2$, of Fig. 1, looking toward the end of the machine away from the rail. Fig. 10 illustrates the slide or torpedo carrier for carrying the torpedoes from the magazine under the exploder or hammer. Fig. 11 is a side view of the brake $j$. Fig. 12 is a plan view of Fig. 11, partly in section, showing the spring at the termination. Fig. 13 is a plan view partly in section showing the cog wheels and the connection from the crank $o$, which connection works in slot $p$ Fig. 1. Fig. 14 is an elevation of the cog wheels. Fig. 15 shows the rail and a sectional view of the lifting bar $k$; said bar is lifted automatically above the rail to be in contact for the tread of the wheel, by the spiral spring $k'$ held in each clip. Fig. 16 is a side elevation of the lifting bar and clip.

The same letters and numerals refer to the same parts in the several figures of the drawings.

$a$, Figs. 1, 2, 3 and 4 is the hammer or exploder, which when the machine is ready for explosion stands half an inch above the rail and is forced down by the first wheel of the locomotive which strikes it, exploding the torpedo under it and raising the lever.

$b$, Figs. 1, 2, 3, 6, 7, 8 and 14 which is attached to the hammer $a$ by the bolt $c$ Figs. 1, 2, 3, 4, 7 and 8 and pivoted at $d$ Figs. 1, 3, 4, 7 and 8, compressing the spiral spring $e$ shown in Fig. 6 and lifting the presser $f$ Figs. 1, 7, 8 and 14 attached to the lever $b$ by the bolt $g$ bringing it to bear on one of the nine bolts in the gear wheel $h$ Figs. 1, 13 and 14. The presser $f$ is provided with a spiral spring $i$ shown in Fig. 7, when the presser is raised to the position shown in Fig. 1 the spring by its bearing against the under side of the lever $b$ pushes the presser forward over the bolt in the gear wheel $h$.

The machine is now ready to load itself for the next train, but by the means of the brake $j$ Figs. 1, 3, 6, 9, 11 and 16 it is held in this position while the train is passing, operated by an automatic lifting bar $k$, shown in Figs. 1, 3, 11, 12, 15 and 16. As soon as the train has left, the bar is moved to its position shown by the dotted lines in Fig. 16 drawing with it the brake $j$ from the friction wheel $l$ Figs. 1, 13 and 14. The lever is now drawn down by the spiral spring $e$, and by the presser $f$ the gear wheel h is moved sufficient to change the position of the bolts in the same one point, imparting to the second gear wheel m Figs. 1, 13 and 14 one revolution, when the lever is stopped from further movement by coming in contact with the cover of the spring barrel n shown in Figs. 1, 3, 6, 9, 13 and 14; to the axle of the second gear wheel m is attached a crank o Figs. 1, 3 and 13 and traveling in the slot of the slide attachment p Figs. 1, 3, 10 and 13, one half its revolution draws the slide q Figs. 1, 2, 6, 9 and 10 back to the magazine t Figs. 1, 3, 4, 6 and 9 to receive another torpedo and the remaining half of its movement pushes the slide forward moving with it the torpedo under hammer a. To the lever b at its rear is attached an arm r Figs. 1, 7 and 8 provided at its rear with an adjusting screw to come in contact with the friction wheel l when the lever b strikes the cover of the spring barrel n thus stopping further movement of the wheel. To the friction wheel l are attached fans l' to regulate the speed. The brake j is provided with a spiral spring j' to hold the machine from reloading with more or less movement of the lifting bar k.

The attachment of the machine to the rail is plainly shown in Figs. 4, 5, 15 and 16. The working parts are all inclosed from water and dust and the machine is calculated to run without oil.

The torpedoes are forced through the magazine by a spiral spring t' shown in Fig. 1. By removing the bolts v Figs. 3, 4, 5, 6 and 9 the top part of the machine can be taken off and with it the slide and all other moving parts.

When the machine is not required it is thrown out of function through the lifting bar k being held below the top of the rail by turning a button, Figs. 15 and 16, marked z. The bar k has a link 21 pivoted to it. Another link 22 is pivoted to the bracket which supports the bar k, and the two links are pivoted together by the pin 23. A bar 24 is also connected to the pin 23 so that the bar k may be operated from a distance. The button z (Fig. 16) has a projection on one side, which bears against the link 21 when turned to the right, and thereby holds the bar k depressed.

When an unexploded torpedo is in position, in the detonator, to give the danger signal to the next train, the said torpedo should be removed before turning the button, if it is desired not to give the danger signal to the next train.

Having fully described my invention, what I claim, and desire to secure by Letters Patent, is—

1. In a detonating signal, the combination, with the hammer arranged to be depressed by a front wheel of the train, of the pivoted lever b connected to the hammer at one end and provided with the presser f at the other, the wheel h provided with pins arranged in the path of the presser, the crank o operatively connected with the wheel h, the slide q operatively connected with the said crank, a torpedo magazine arranged over the slide q, and a spring operatively connected to the lever b, whereby a torpedo is placed under the hammer by the slide q, substantially as set forth.

2. In a detonating signal, the combination, with a hammer arranged to be depressed by a front wheel of the train, of the pivoted lever b connected to the hammer at one end and provided with the presser f at the other, the toothed wheel h provided with pins arranged in the path of the presser, the toothed wheel m operatively connected with the toothed wheel h, the crank o driven by the wheel m, the friction wheel l operatively connected with the wheel m, the slide q provided with the slotted attachment p engaging with the said crank, a torpedo magazine arranged over the slide q, a spring operatively connected to the lever b, and a brake arm r attached to the lever b and caused to press on the wheel l by the said spring when a torpedo has been placed under the hammer, substantially as set forth.

3. In a detonating signal, the combination, with the depressible hammer, the torpedo magazine, the slide q operating to place the torpedo under the hammer, and intermediate driving mechanism operatively connecting the said hammer and slide, and provided with the friction wheel l; of the brake j arranged to press on the wheel l, and the depressible bar k operating the said brake and holding the slide q stationary while the train is passing, substantially as set forth.

4. In a detonating signal, the combination, with the depressible hammer, the torpedo magazine, the slide q operating to place the torpedo under the hammer, and intermediate driving mechanism operatively connecting the said hammer and slide, and provided with the friction wheel l; of the brake j, the depressible bar k provided with springs for raising it automatically, and means for holding the bar k in its lowest position substantially as set forth, whereby the whole device is thrown out of operation.

HENRY FROST CLARK.

Witnesses:
CHAS. B. BRUNNER,
WILLIAM S. SIDDERS.